United States Patent
Yerkes

(10) Patent No.: US 9,159,072 B2
(45) Date of Patent: Oct. 13, 2015

(54) SYSTEMS AND METHODS FOR MARKING COLLECTIBLES TO INCREASE THEIR UNIQUENESS

(75) Inventor: Andre Alan Yerkes, Evergreen, CO (US)

(73) Assignee: Crystalier, Limited, Evergreen, CO (US)

( * ) Notice: Subject to any disclaimer, the term of this patent is extended or adjusted under 35 U.S.C. 154(b) by 2609 days.

(21) Appl. No.: 11/690,106

(22) Filed: Mar. 22, 2007

(65) Prior Publication Data

US 2008/0229959 A1    Sep. 25, 2008

(51) Int. Cl.
*B42D 15/00* (2006.01)
*B42D 25/405* (2014.01)
*G06Q 30/02* (2012.01)
*G06Q 10/08* (2012.01)
*B42D 25/00* (2014.01)

(52) U.S. Cl.
CPC ............... *G06Q 30/02* (2013.01); *B42D 25/00* (2014.10); *G06Q 10/087* (2013.01); *B42D 2035/08* (2013.01)

(58) Field of Classification Search
CPC ............... B42D 15/00; B42D 25/405
USPC .................. 283/67, 70, 74; 235/494
See application file for complete search history.

(56) References Cited

U.S. PATENT DOCUMENTS

| | | |
|---|---|---|
| 1,145,447 A | 7/1915 | Todd et al. |
| 1,153,544 A | 9/1915 | Eddy |
| 4,139,219 A | 2/1979 | Herndon |
| 5,447,335 A | 9/1995 | Haslop |
| 5,489,096 A | 2/1996 | Aron |
| 5,950,197 A | 9/1999 | Beam |
| 5,971,435 A | 10/1999 | DiCesare et al. |
| 6,082,774 A | 7/2000 | Schlauch |
| 6,568,327 B1 | 5/2003 | Jones et al. |
| D480,750 S | 10/2003 | Chepaitis |
| 6,862,984 B2 | 3/2005 | Sosin |
| 6,932,668 B2 | 8/2005 | Digby et al. |

(Continued)

FOREIGN PATENT DOCUMENTS

WO    WO03009520    1/2003

OTHER PUBLICATIONS

Excel Date (2002) http://www.codeproject.com/KB/datetime/exceldmy.aspx.*

(Continued)

*Primary Examiner* — Kyle Grabowski
(74) *Attorney, Agent, or Firm* — Faegre Baker Daniels LLP

(57) ABSTRACT

According to an embodiment of the present invention, a method for marking collectible items to increase their collectible uniqueness includes creating a multiplicity of unique date codes, each of the multiplicity of unique date codes including a representation of a calendar month and a representation of a day in the calendar month, randomly selecting one of the multiplicity of unique date codes, and affixing the randomly selected one of the multiplicity of unique date codes to a collectible item. According to other embodiments, a system with a computer and a marking device may apply a date code to a collectible item. According to yet other embodiments, a method for marking collectibles includes creating at least three hundred sixty-five collectibles in a time period shorter than a year, and marking each with a unique date code combination such that no two visually identical collectibles share the same date code.

9 Claims, 6 Drawing Sheets

(56) References Cited

U.S. PATENT DOCUMENTS

| | | |
|---|---|---|
| 6,950,024 B2 | 9/2005 | Wunderlick |
| 7,046,828 B1 | 5/2006 | Gibbs et al. |
| 7,114,510 B2 | 10/2006 | Peters et al. |
| 7,149,503 B2 | 12/2006 | Aarnio et al. |
| 7,594,604 B2 * | 9/2009 | Haas ............................. 235/494 |
| 2005/0011093 A1 * | 1/2005 | Peterson ......................... 283/70 |
| 2005/0289345 A1 * | 12/2005 | Haas et al. ...................... 283/74 |

OTHER PUBLICATIONS

Library Research Service http://www.lrs.org/news/2006/01/10/Random_Date_Generator_Created/.*
Classified advertisement for 1/72 F-14B Tomcat VF-143 Pukin Dogs Last Cruise, located at www.sell.com, downloaded Jan. 23, 2007.

* cited by examiner

SYSTEMS AND METHODS FOR MARKING COLLECTIBLES TO INCREASE THEIR UNIQUENESS

TECHNICAL FIELD

Embodiments of the present invention relate generally to systems and methods for creating collectibles, and more specifically to systems and methods for marking collectible items.

BACKGROUND

People collect a wide variety of different items. However, when several people subjectively come to believe an item is interesting, sentimental, or valuable, it can become a collectible. Some collectibles become so popular that the market demand becomes the focus of a collector's craze. Often companies, selling mass-produced items, try to increase demand by advertising some "scarcity" of supply. Some label items as "Limited Editions," for example, set specific production quantities, affix consecutive numbers, (1/1000, 2/1000, 3 of 1000, etc), list one specific manufacturing date, or announce one future retirement date for an entire series of collectible items.

SUMMARY

Embodiments of the present invention include methods for marking collectible items to increase their collectible uniqueness. Such methods include creating a multiplicity of unique date codes, each of the multiplicity of unique date codes comprising a representation of a calendar month and a representation of a day in the calendar month, randomly selecting one of the multiplicity of unique date codes, and affixing the randomly selected one of the multiplicity of unique date codes to a collectible item. According to some embodiments of the present invention, the collectible item is one of a set of visually identical items, and the randomly selected unique date code is not affixed to any other collectible item in the set. According to some embodiments, each of the multiplicity of unique date codes may further comprise a representation of a calendar year, a representation of a number, a symbol, a representation of an alphanumeric character, a word, and/or a trademark. According to some embodiments of the present invention, the multiplicity of unique date codes is at least three hundred sixty-five unique date codes.

Methods for marking collectible items to increase their uniqueness, according to embodiments of the present invention, may include creating at least three hundred sixty-five collectible items in a time period shorter than three hundred sixty-five days and marking each of the at least three hundred sixty-five collectible items with a unique combination of a month and a day of the month, such that each of the at least three hundred sixty-five collectible items is visually identical except for the marking. The time period over which the collectible items are created and/or over which the markings are applied may be shorter than one month, or shorter than a day in some cases. The unique combination applied to the collectibles may include a year, a trademark, a symbol, a word, a single digit number, and/or other elements. According to some embodiments of the present invention, the at least three hundred sixty-five collectible items are three hundred sixty-six collectible items.

A system for marking a collectible item according to embodiments of the present invention may include a computer and a marking device. The computer may be communicably coupled to a computer readable medium, which includes instructions executable by the computer to receive a multiplicity of unique date codes, each of the multiplicity of unique date codes including a representation of a calendar month and a representation of a day in the calendar month, and randomly select one of the multiplicity of unique date codes. A marking device may be configured to receive the randomly selected date code and affix the randomly selected date code to a collectible item. The marking device may be configured to affix the randomly selected date code to the collectible item by permanently printing the randomly selected date code on a tangible object, such as, for example, a sticker, and affixing the tangible object to the collectible item. The marking device, according to other embodiments of the present invention, may be configured to permanently affix the randomly selected date code to the collectible item with a process of permanently printing, etching, engraving, molding, and/or sandblasting.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
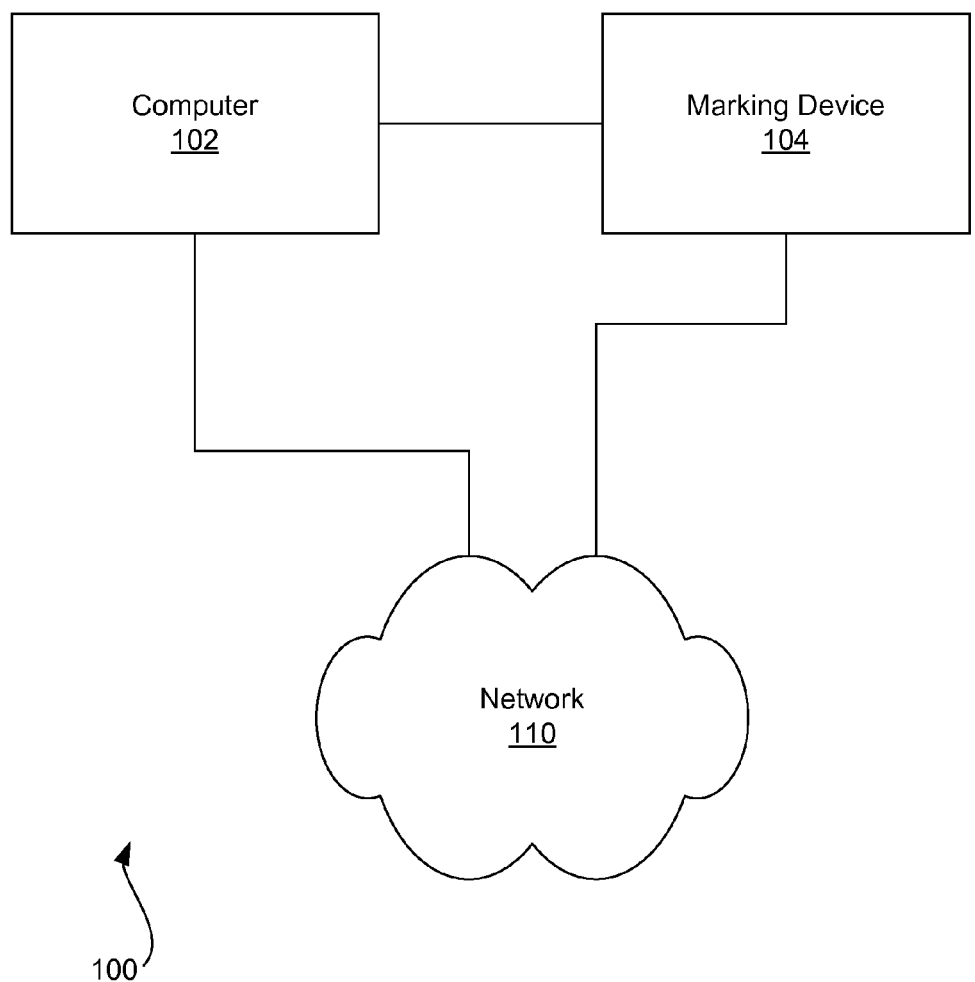
FIG. 1 illustrates an exemplary marking system, according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Embodiments of the present invention include a method to permanently affix a random date code onto an item, to affix a different date code onto a separate identical item, to not intentionally affix a visually identical date code on a visually identical item, and to thereby create an individually unique item or set of items which is more interesting, sentimental, valuable, and/or collectible.

According to some embodiments of the present invention, the date code may be created from 366 annual calendar dates. The date-code is random; has no significance to the item onto which it is affixed; records neither the day the date code, or the item, is conceived, created, marked, packaged, shipped, sold, used, and/or expired; may list any date from a past, present, or future year; and may even list a leap-year daily date of "February 29" linked with a non leap-year annual date, according to embodiments of the present invention.

According to some embodiments of the present invention, the date code conveys important information to the owner of the item, and may come to be considered more important than the item that the date code is affixed onto. Uniqueness enhances the collectible nature of the item. A single calendar date enhances the sentimental nature of the item. The specified limit of quantity, or scarcity of number, enhances the value of the item.

Embodiments of the present invention convert a somewhat fungible item into an individually unique, interesting, and specifically-identifiable, collectible. This may make an item more interesting, sentimental, valuable, and collectible. People often take an interest in days associated with themselves. All people have birthdays, and many find their birthday to be more interesting than most any other date in the calendar year. People are also subjectively sentimental about other dates, such as, for example, an anniversary, graduation, or religious holiday, which are important to them, their friends, family, or loved ones. In one calendar year there are either 365 or 366 days. A date which is important to one person may be emotionally irrelevant to another, but each date in the calendar year is important to one large segment of the population.

Many people share an interest in numbers. Some think a certain number is lucky, while others believe the same number is unlucky, or perhaps even irrelevant. However, if items are consecutively numbered, collectors have developed a belief that lower numbers are more desirable, and therefore more valuable, than higher numbers. People also attach great emotional significance to different shapes, symbols, or portions of symbols. Many acquire souvenirs which sentimentally remind them of a geographic location, an organization, or a specific event which is somehow subjectively important to them. Finally, many people only collect one particular segment, or one specific size, within a field of collectibles.

According to some embodiments of the present invention, the random use of calendar dates, without any other accompanying number, symbol, word, or indicia, may have no particular meaning on an item. Such a date may not serve to indicate the item's creation, expiration, use, or purpose. Currently, dates are not printed on items if the dates are completely pointless or nonsensical.

FIG. 1 illustrates an exemplary marking system 100 according to embodiments of the present invention. Marking system 100 includes a computer 102 and a marking device 104. Computer 102 may be configured to select, generate, or otherwise provide one or more date codes based on a random selection or for purposes of marking a complete 365 or 366 days set of items with date codes. The date code provided by computer 102 may be provided in final format or, alternatively, may be provided in another format recognizable by marking device 104 to produce a marking on the collectible item which resembles the final format.

According to some embodiments of the present invention, the marking device 104 may be a configured to permanently affix a date code to a collectible item. For example, marking device 104 may be a sandblasting device capable of blasting sand through a template of the date code, where such date code is provided by the computer 102 and/or randomly selected by an operator of the marking device 104. According to some embodiments of the present invention, marking device 104 may be configured to permanently print, etch, engrave, and/or mold the date code into the collectible item. According to other embodiments of the present invention, the marking device 104 may be configured to permanently print the date code on a tangible object and affix the tangible object to the collectible item. For example, the marking device 104 may be configured to print the date code onto a sticker or label, which may then be affixed by the marking device 104 or a person to the collectible item. Computer 102 may be communicably connected to marking device 104, either directly, or indirectly via a network 110, in a way which permits information and data to be exchanged between computer 102, marking device 104, and network 110.

Figure 2:
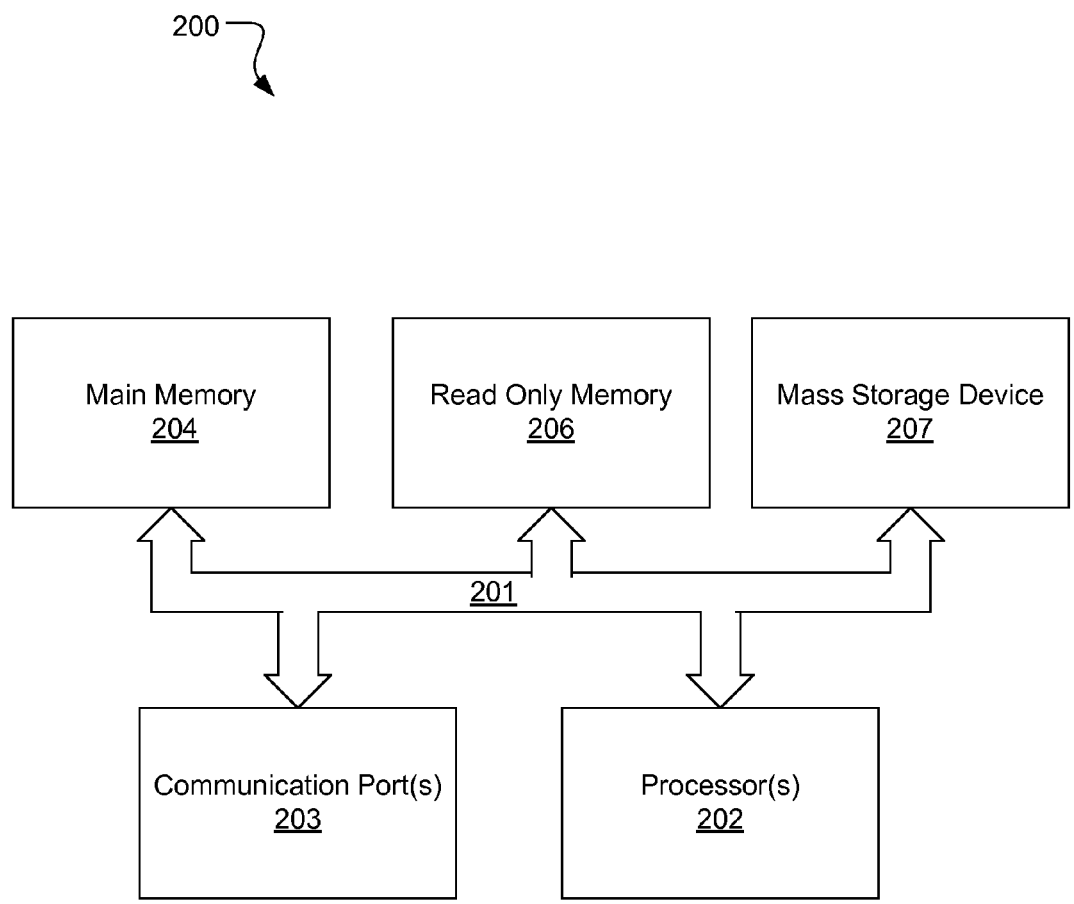
FIG. 2 illustrates an exemplary computer, according to embodiments of the present invention.

FIG. 2 is an example of a computer system 200 with which embodiments of the present invention may be utilized. Computer system 200 represents an exemplary computer 102 which may implement one or more of the methods discussed herein for generating and/or selecting a date code. In this simplified example, the computer system 200 comprises a bus 201 or other communication means for communicating data and control information, and one or more processing devices 202, such as a well known processor, Application Specific Integrated Circuit (ASIC), a field programmable gate array (FPGA), or the like, coupled with bus 201.

In this simplified embodiment, computer system 200 further comprises a random access memory (RAM) or other dynamic storage device (referred to as main memory 204), coupled to bus 201 for storing information and instructions to be executed by processing device 202. Main memory 204 also may be used for storing temporary variables or other intermediate information during execution of instructions by processor(s) 202.

Computer system 200 can also include a read only memory (ROM) 206 and/or other static storage device coupled to bus 201 for storing static information and instructions for processing device 202. A mass storage device 207, such as a magnetic disk or optical disc and its corresponding drive, may also be coupled to bus 201 for storing instructions and information, such as configuration files, a key store and registration database, etc.

One or more communication ports 203 may also be coupled to bus 201 for supporting network connections and communication of information to/from the computer system 200 by way of a communication network, such as a Local Area Network (LAN), Wide Area Network (WAN), or the Internet, for example. The communication ports 203 may include various combinations of well-known interfaces, such as one or more modems to provide network access, one or more 10/100 Ethernet ports, one or more Gigabit Ethernet ports (fiber and/or copper), or other well-known network interfaces commonly used in internetwork environments. In any event, in this manner, the computer system 200 may be coupled to a number of other network devices, communication devices, clients, NTMs, and/or servers via a conventional communication network infrastructure.

Optionally, operator and administrative interfaces (not shown), such as a display, keyboard, and a cursor control device, may also be coupled to bus 201 to support direct operator interaction with computer system 200. Other operator and administrative interfaces can be provided through network connections connected through communication ports 203. Finally, removable storage media (not shown), such as one or more external or removable hard drives, tapes, floppy disks, magneto-optical discs, compact disk-read-only memories (CD-ROMs), compact disk writable memories (CD-R, CD-RW), digital versatile discs or digital video discs (DVDs) (e.g., DVD-ROMs and DVD+RW), Zip disks, or USB memory devices, e.g., thumb drives or flash cards, may be coupled to bus 201 via corresponding drives, ports or slots.

Figure 3:
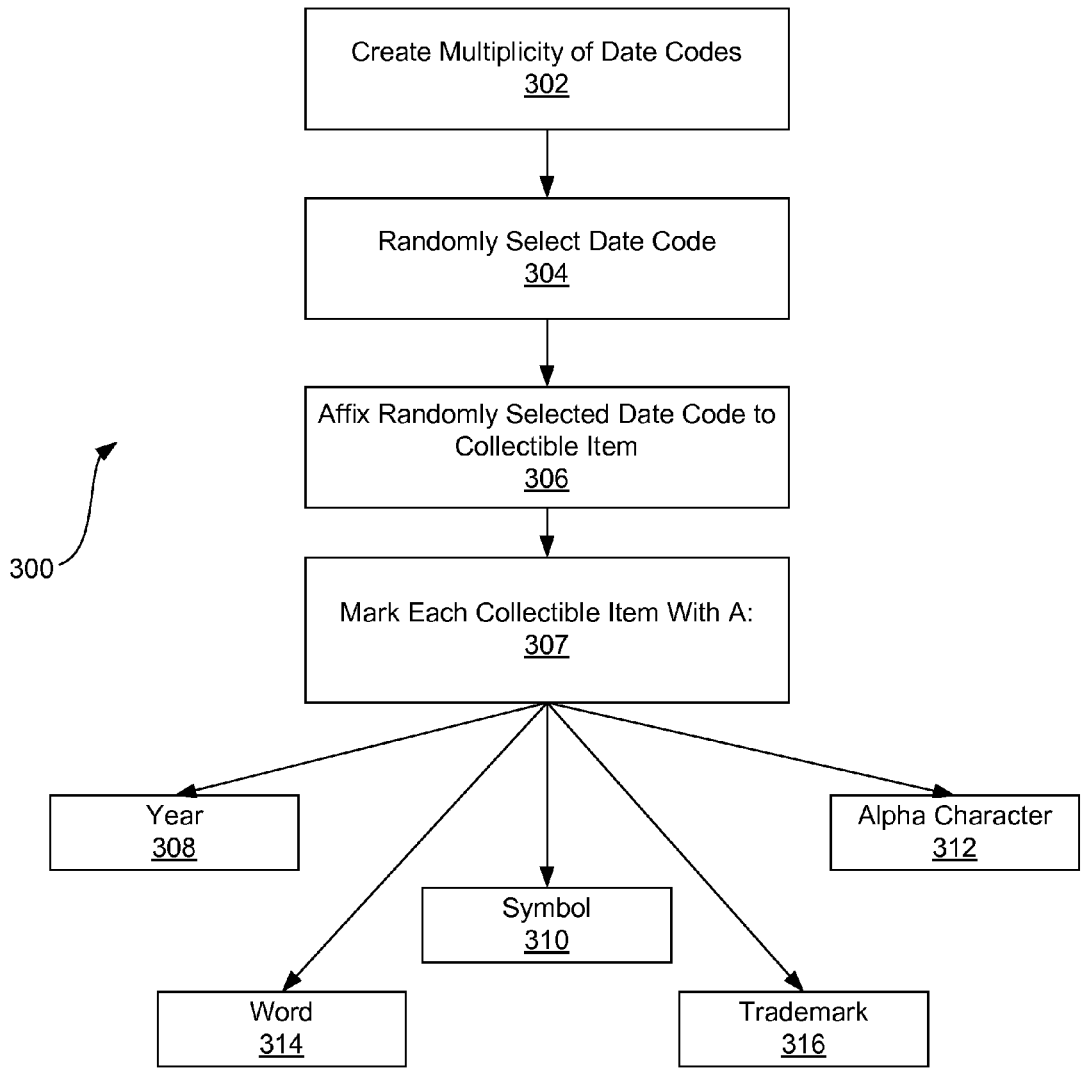
FIG. 3 depicts a flow diagram illustrating a method for marking a collectible item, according to embodiments of the present invention.

FIG. 3 depicts a flow diagram 300 illustrating a method for marking a collectible item, according to embodiments of the present invention. A multiplicity of unique date codes may be created (block 302), such that each of the multiplicity of unique date codes includes a representation of a calendar month and a representation of a day in the calendar month. For example, one of the multiplicity of date codes may be "February 27." Another example could be "June 4." Such date codes may also be represented in different formats, such as, for example, "Feb. 27," "02/27," "2/27," and "27 February." According to some embodiments of the present invention, no date code within the multiplicity of date codes represents the same month and day combination as another date code within the multiplicity of date codes, thereby making each of the multiplicity of date codes unique.

One of the multiplicity of date codes may be randomly selected (block 304). According to some embodiments of the present invention, the random selection of the date code may be made by a computer which associates an index with each of the multiplicity of unique date codes and then chooses one index through the use of a random number generator. Alternatively, the computer may randomly select one of the multiplicity of date codes by running a software algorithm intended to mimic or approximate a genuinely random selection. According to some embodiments of the present invention, the random selection of a unique date code involves a selection method which does not involve choosing a particular date code which has any particular relevance or relation to the item on which it is to be applied.

Figure 5:
FIG. 5 illustrates a set of symbols that may be used to mark a collectible item, according to embodiments of the present invention.

Once the date code has been randomly selected, the date code is affixed to a collectible item (block 306). Further markings may optionally be applied to the collectible item (block 307). For example, a year or representation of a year (e.g. "2008") may be applied (block 308); a word (e.g. "HELLO") may be applied (block 314); a symbol (e.g. a peace sign) may be applied (block 310); a trademark may be applied (block 316); and an alphanumeric character or combination thereof (e.g. "7T") may be applied (block 312). Based on the disclosure provided herein, one of ordinary skill in the art will recognize that other elements may be added to the date code marking applied to a collectible item. FIG. 5 illustrates various date codes, symbols, and other elements with which the collectible item may be marked.

Figure 4:
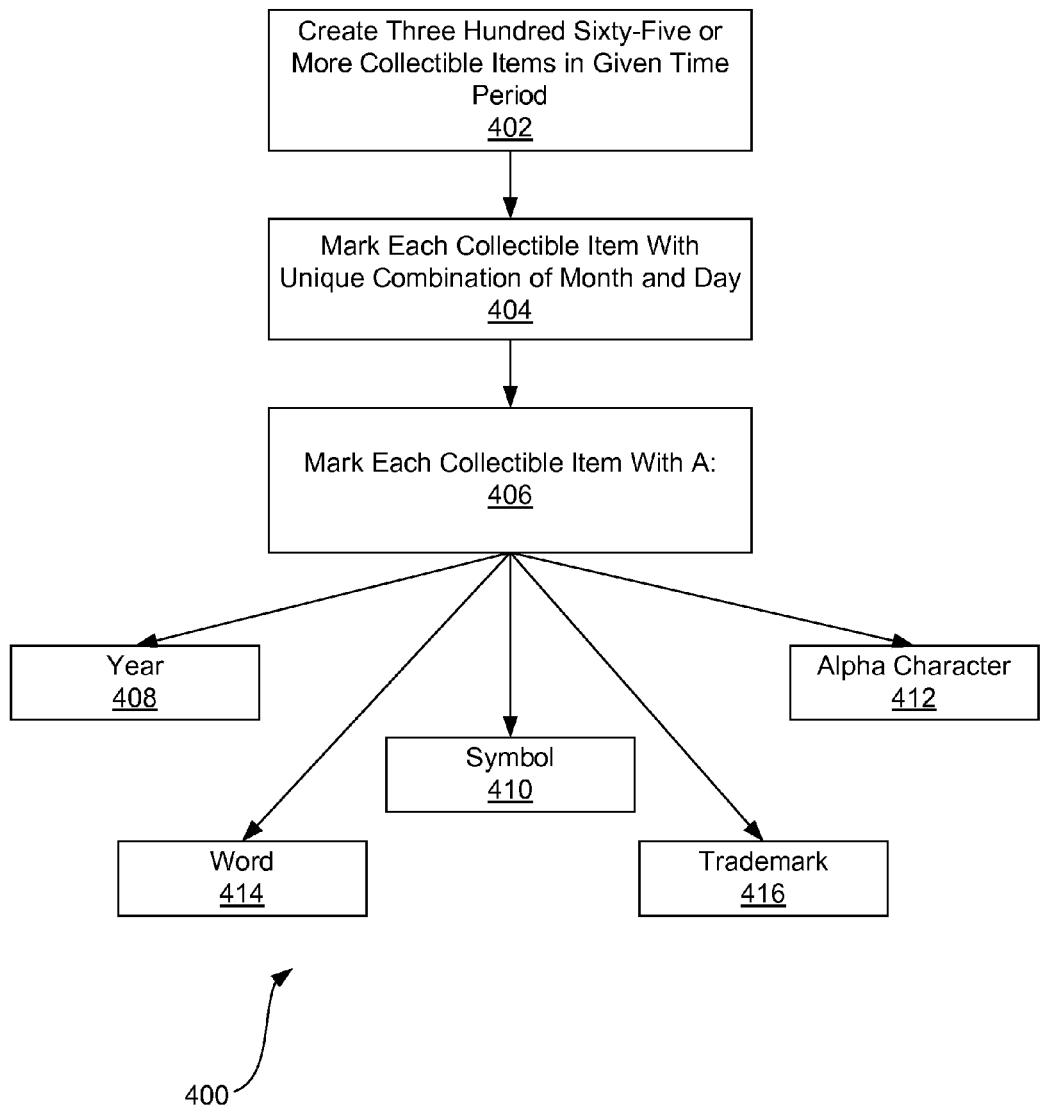
FIG. 4 depicts a flow diagram illustrating a method for marking a collectible item, according to embodiments of the present invention.

FIG. 4 depicts a flow diagram 400 illustrating a method for marking a collectible item, according to embodiments of the present invention. A set of at three hundred sixty-five collectible items may be created in a time period shorter than one year (block 402). Each collectible item in the set may be marked with a unique combination, which includes a month and a day of the month (block 404), according to embodiments of the present invention. Optionally, each collectible item in the set may also be marked with an additional element (block 406), according to embodiments of the present invention. For example, such an additional element may be a representation of a year (block 408), a word (block 414), a symbol (block 410), a trademark (block 416), and/or an alphanumeric character or set of characters (block 412), according to embodiments of the present invention. Affixing a date code or other marking to an item may include printing or permanently printing the date code directly onto the item, printing the date code onto an object, such as, for example, a sticker or label, and applying the object to the item, and/or etching, engraving, molding, and sandblasting the date code onto the item, according to embodiments of the present invention.

FIG. 5 illustrates a set of ten exemplary date code markings, according to embodiments of the present invention. The date code of "January 03" appears in each marking, along with an added place name "Denver," a year "2008," and a trademark, "Bupels." Also included in each marking is a number and a symbol, which, according to the embodiments of a date code marking in FIG. 5, have been stylistically intertwined. For example, one exemplary marking includes a dot-dash smiley-face symbol incorporating the number zero (which may suggest a concept of happiness), according to embodiments of the present invention. Another exemplary marking includes an exclamation point symbol incorporating the number one (which may suggest a concept of success), according to embodiments of the present invention. Other exemplary markings include: a heart symbol surrounding the number two (which may suggest a concept of love), a triangle symbol surrounding the number three (which may suggest a concept of adventure), a diamond symbol surrounding the number four (which may suggest a concept of prosperity), a star symbol surrounding the number five (which may suggest a concept of faith), a yin-yang symbol incorporated into the number six (which may suggest a concept of harmony), a shamrock symbol incorporated into the number seven (which may suggest a concept of luck), a caduceus-like symbol incorporating the number eight (which may suggest a concept of health), and a peace sign symbol incorporated into the number nine (which may suggest peace), according to embodiments of the present invention. Based on the disclosure provided herein, one of ordinary skill in the art will recognize that other markings featuring different combinations of a date code, year, place, trademark, number, symbol, and other elements are possible.

Figure 6:
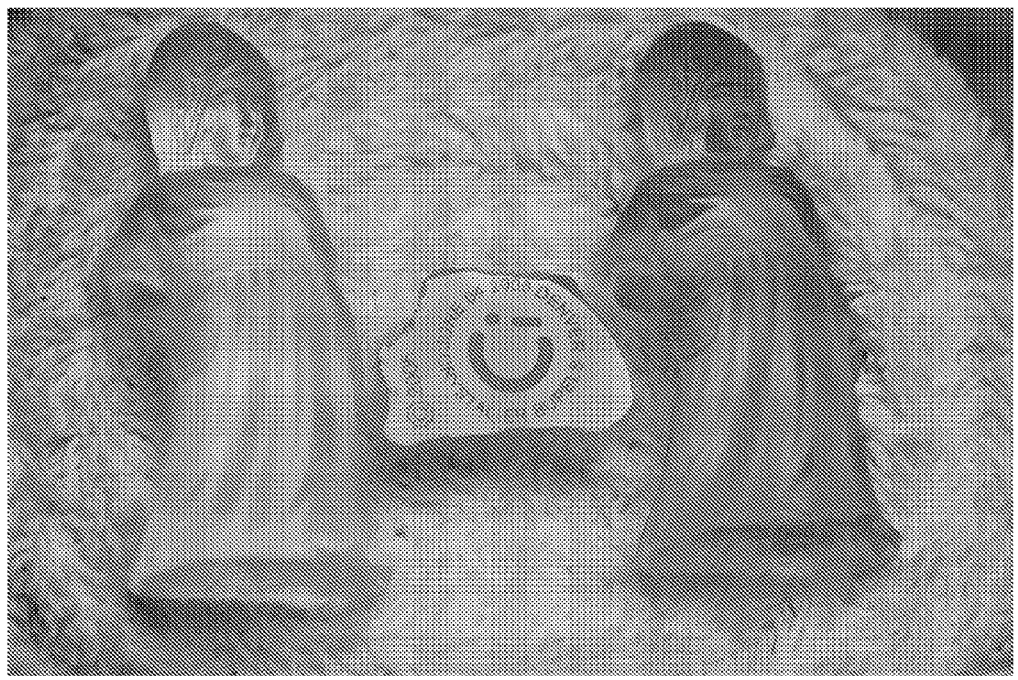
FIG. 6 depicts a collectible item marked according to embodiments of the present invention.

FIG. 6 illustrates a set of collectible items which, as illustrated, may be glass figurines. A marking, which includes a date code, may be affixed to the collectible item, for example to a flat bottom of the collectible item as depicted in FIG. 6, according to embodiments of the present invention. According to some embodiments of the present invention, the marking including the date code may be formed in a template through which a sandblaster blows sand, such that the template permits the abrasive particles to pass through the template in the areas forming the marking such that the pattern of the marking is etched into the glass figurine, according to embodiments of the present invention.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

I claim:

1. A method for marking collectible items to increase their collectible uniqueness, the method comprising:
   creating a multiplicity of unique date codes, each of the multiplicity of unique date codes comprising
      a calendar month word or textual abbreviation thereof selected from the group consisting of: January, February, March, April, May, June, July, August, September, October, November, and December; and
      a number of a day in the calendar month;
   randomly selecting one of the multiplicity of unique date codes; and
   affixing the randomly selected one of the multiplicity of unique date codes to a collectible item.

2. The method of claim 1, wherein the collectible item is one of a plurality of visually identical items, and wherein the randomly selected one of the multiplicity of unique date codes is not affixed to any other collectible item of the plurality of visually identical items.

3. The method of claim 1, wherein each of the multiplicity of unique date codes further comprises a representation of a calendar year.

4. The method of claim 1, wherein each of the multiplicity of unique date codes further comprises a representation of a number.

5. The method of claim 1, wherein each of the multiplicity of unique date codes further comprises a symbol.

6. The method of claim 1, wherein each of the multiplicity of unique date codes further comprises a representation of an alphanumeric character.

7. The method of claim 1, wherein each of the multiplicity of unique date codes further comprises a word.

8. The method of claim 1, wherein each of the multiplicity of unique date codes further comprises a trademark.

9. The method of claim 1, wherein the multiplicity of unique date codes is at least three hundred sixty-five unique date codes, and wherein each of the at least three hundred sixty-five unique date codes comprises a unique combination of calendar month word and number of a day.

\* \* \* \* \*